United States Patent [19]

Harrer et al.

[11] 4,047,638
[45] Sept. 13, 1977

[54] SEED DISC FOR AN AIR PLANTER

[75] Inventors: Paul H. Harrer; LeRoy Langford, both of LaPorte, Ind.

[73] Assignee: Allis-Chalmers Corporation, Milwaukee, Wis.

[21] Appl. No.: 680,332

[22] Filed: Apr. 26, 1976

Related U.S. Application Data

[63] Continuation of Ser. No. 511,385, Oct. 2, 1974, abandoned.

[51] Int. Cl.² .......................... A01C 7/04; B65G 29/00
[52] U.S. Cl. ........................................ 221/266; 111/77; 221/278
[58] Field of Search .............. 221/211, 265, 266, 278; 111/78, 77; 222/369

[56] References Cited

U.S. PATENT DOCUMENTS

| | | | |
|---|---|---|---|
| 835,040 | 11/1906 | Snyder | 221/265 |
| 1,331,235 | 2/1920 | Bristow | 221/211 |
| 3,533,535 | 10/1970 | Knapp | 221/211 |
| 3,608,787 | 9/1971 | Grataloup | 222/342 |
| 3,659,746 | 5/1972 | Winslow | 221/265 X |
| 3,888,387 | 6/1975 | Deckler | 221/278 |

*Primary Examiner*—Robert B. Reeves
*Assistant Examiner*—Francis J. Bartuska
*Attorney, Agent, or Firm*—Charles L. Schwab

[57] ABSTRACT

A rotating disc has perforated seed pockets which pick up individual kernels of seed from an air pressurized cavity of a planter housing. Air flowing through the perforated pockets creates a pressure differential which moves a kernel into each pocket as the pocket moves on a circular path upwardly through the cavity. The pocket then moves into axially confronting relation with a flat sealing surface. The flat sealing surface holds the seed in the pocket as the disc rotates further to bring the pocket to the lower part of the housing where the seed falls by gravity into the soil. Each of the circumferentially spaced pockets has an opening in its bottom which is large enough to permit air flow therethrough but smaller than the seed kernels to be planted. The pockets are clam shell shaped with the more gentle slope on the side of the pocket toward the direction of rotation of the disc during planting. The opposite side of the pocket has a steep slope whereby the seed in the pocket is mechanically assisted in its assent from the seed cavity. The seed disc for corn includes a camming groove extending from each pocket which cams corn kernels radially outwardly toward the pocket as it passes upwardly through the seed cavity.

6 Claims, 18 Drawing Figures

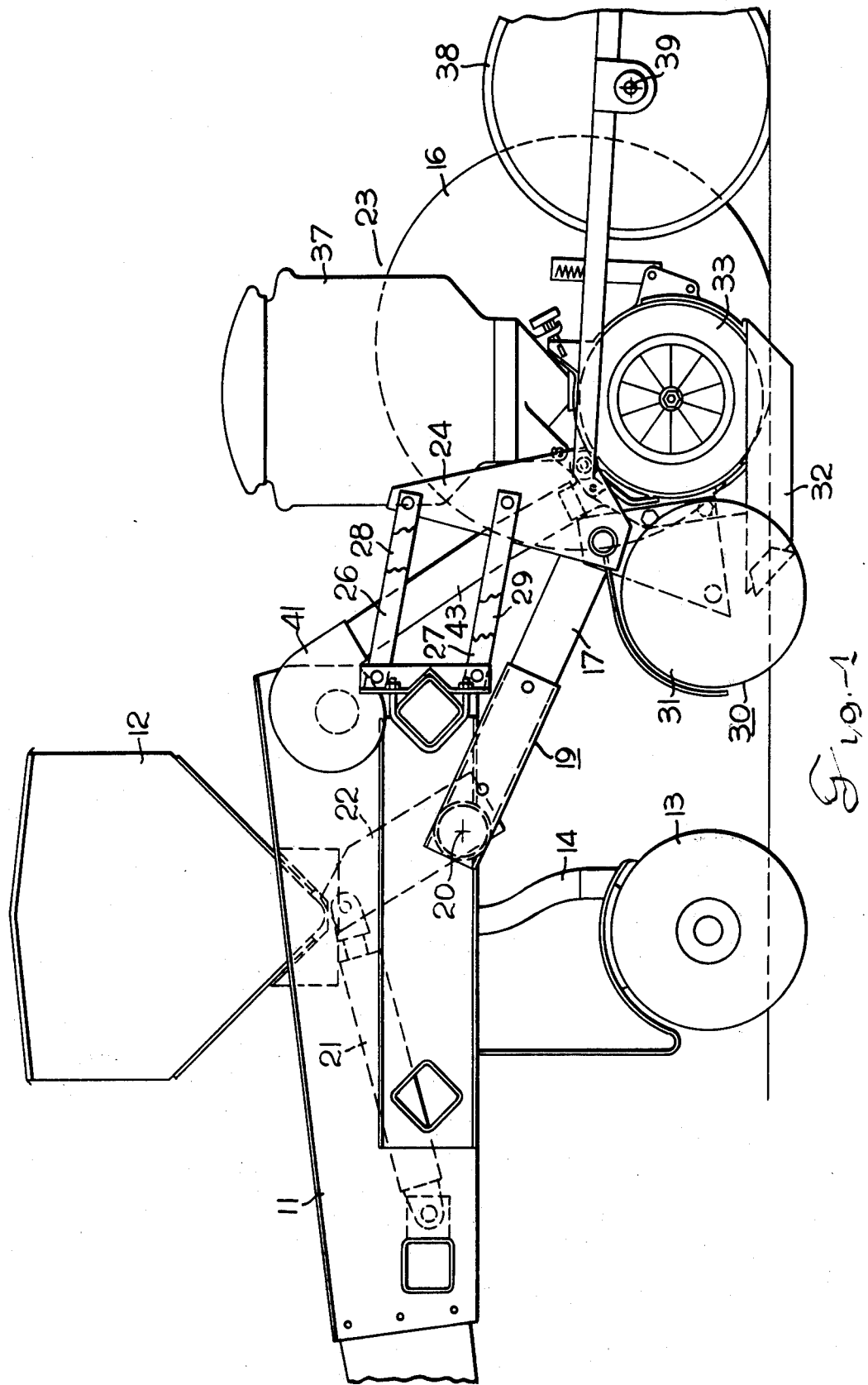

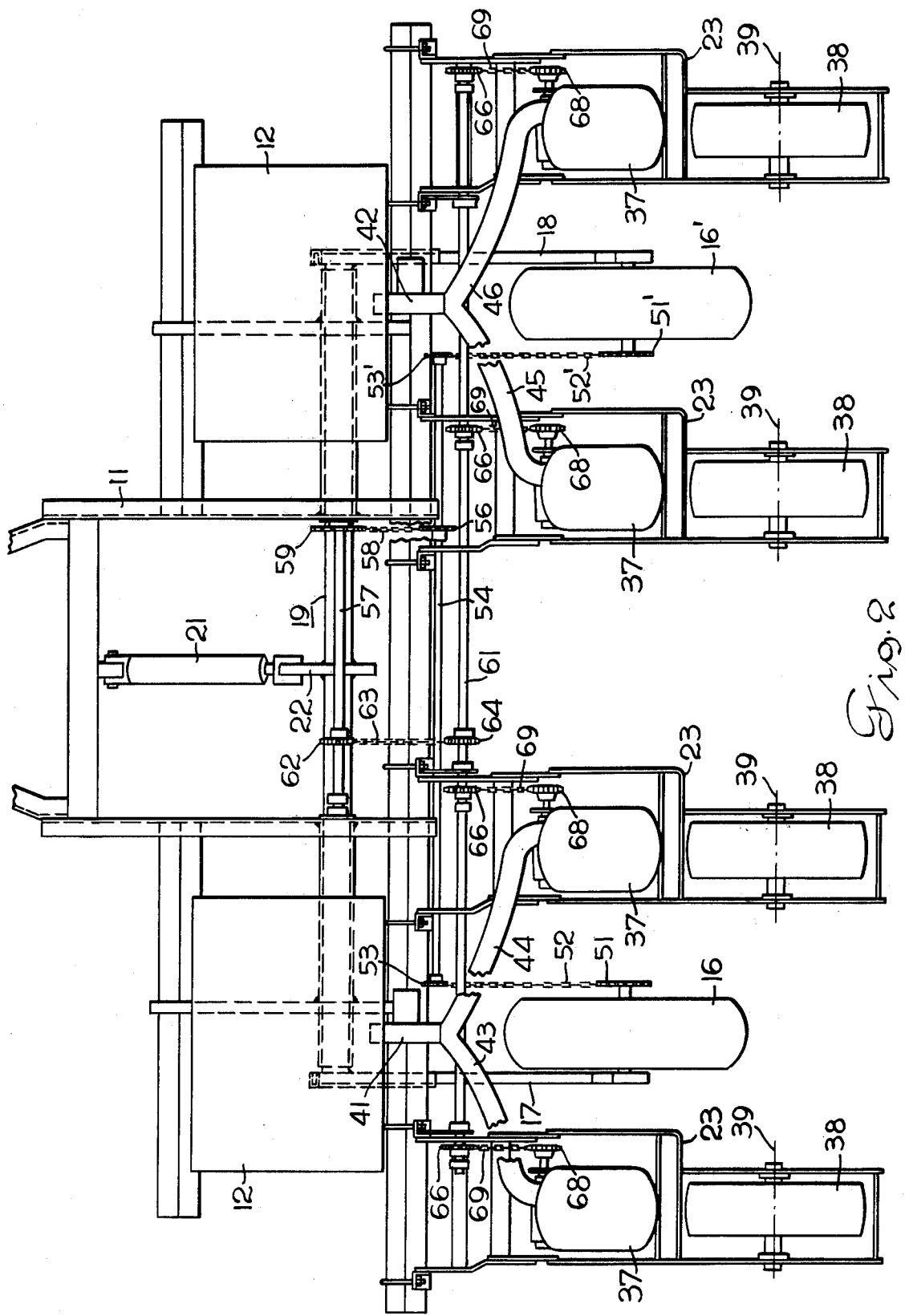

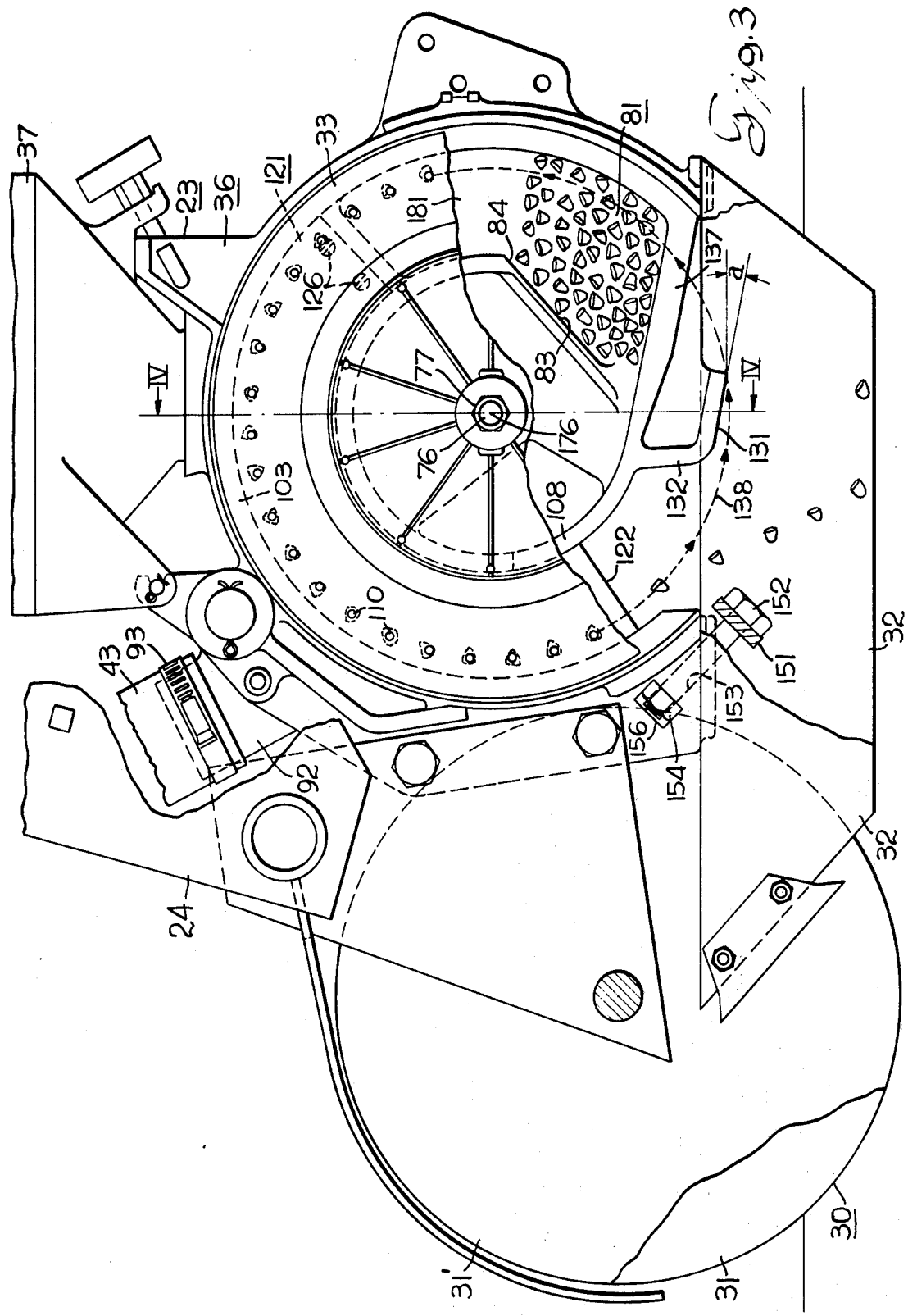

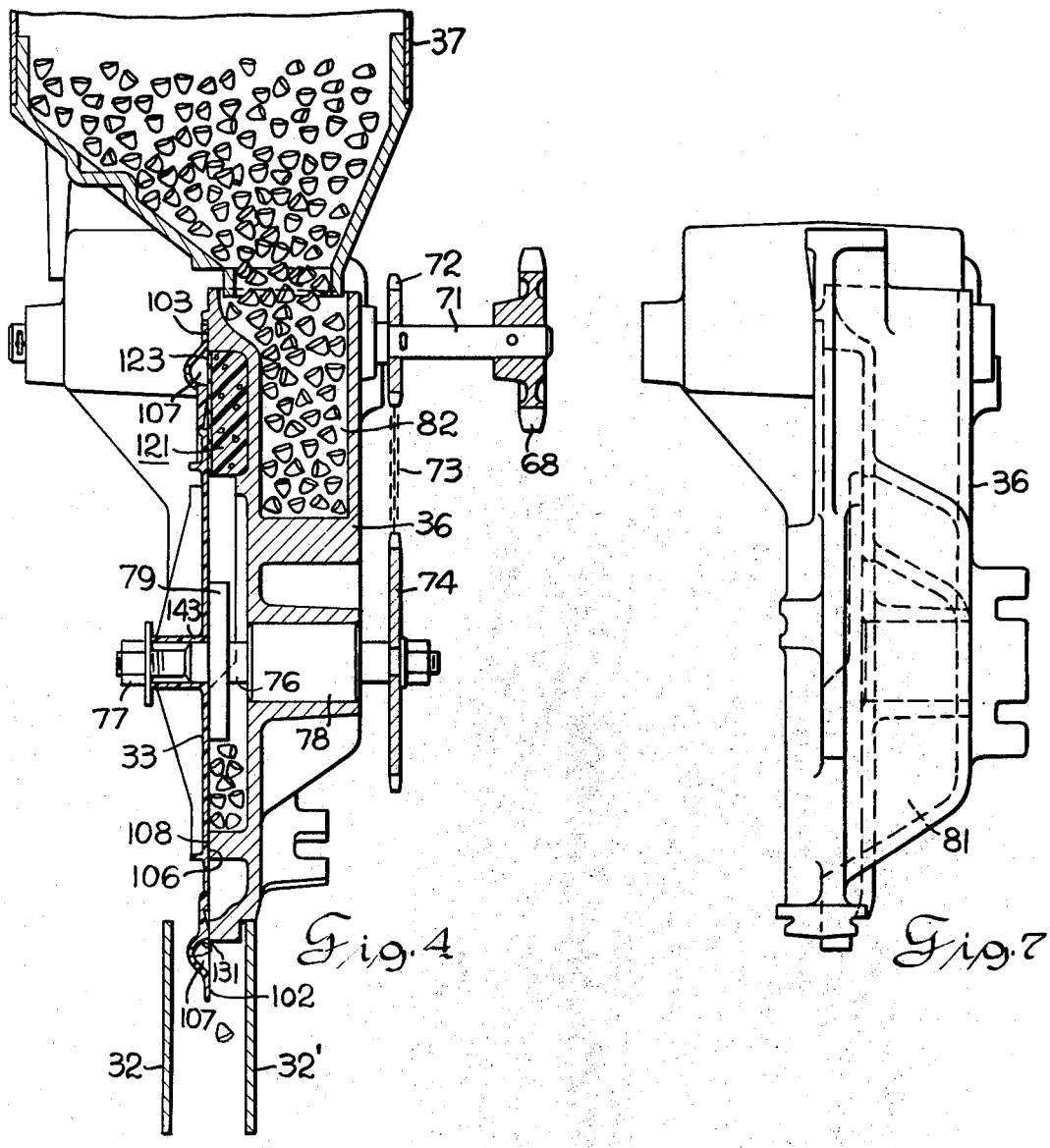

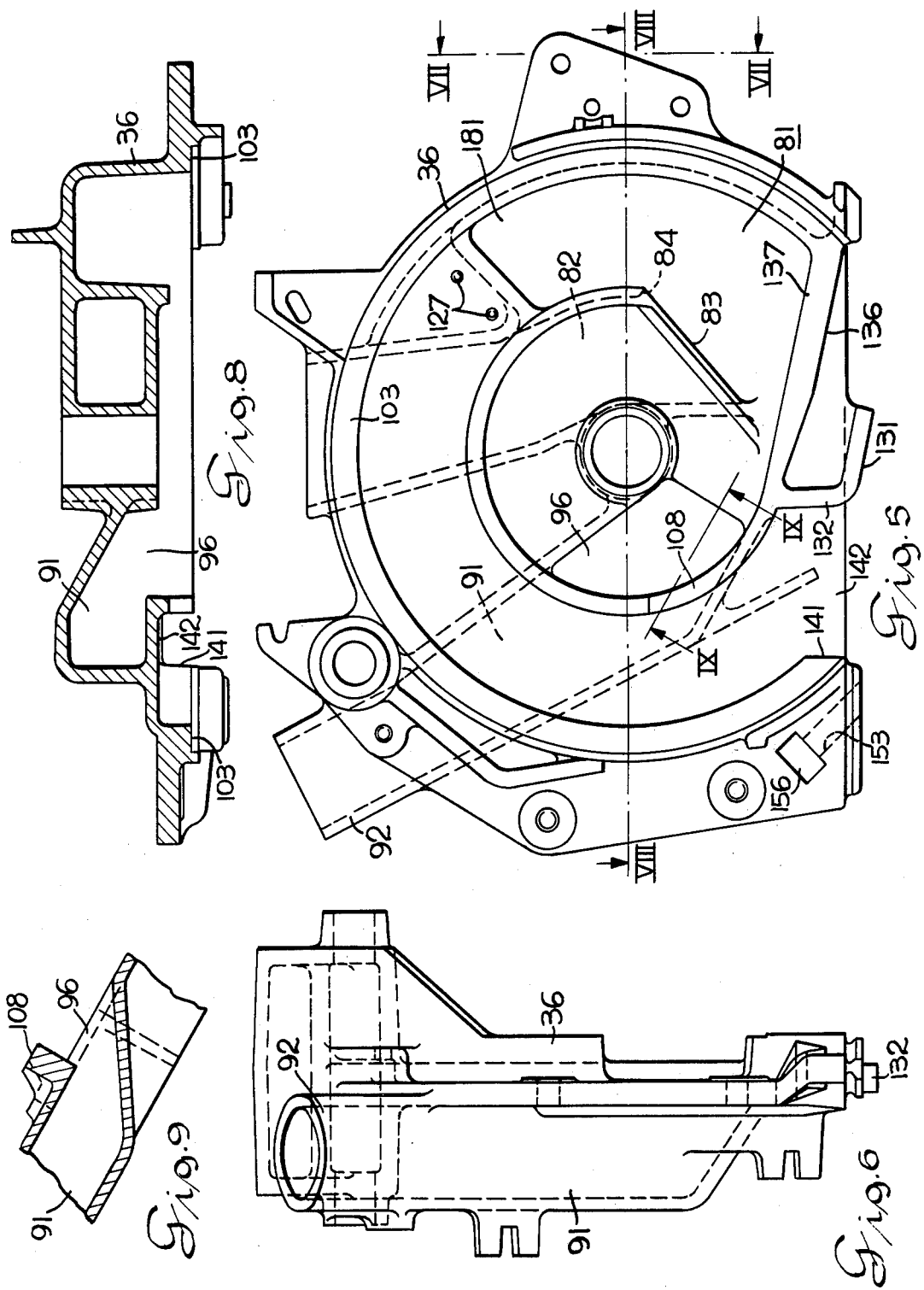

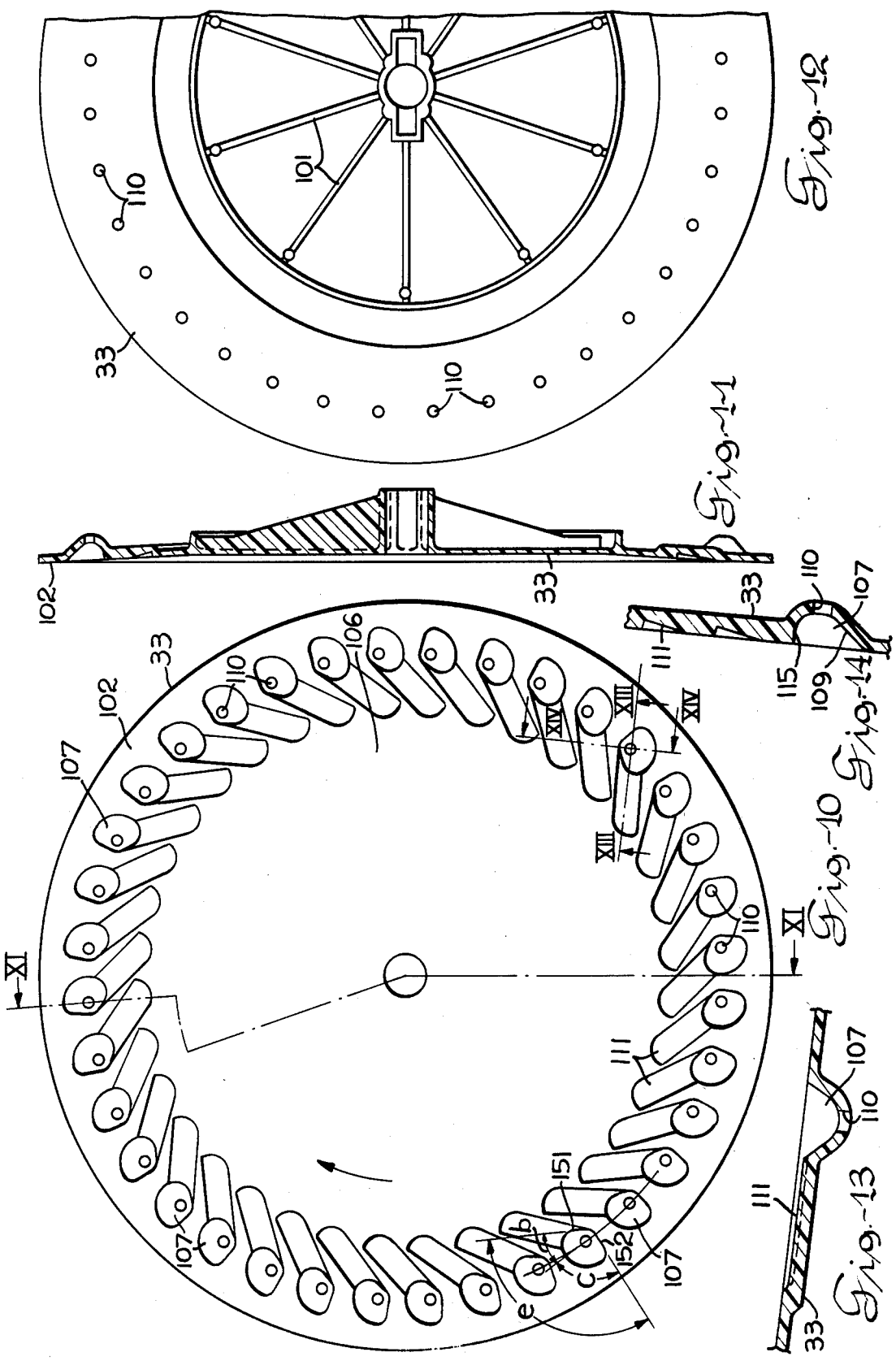

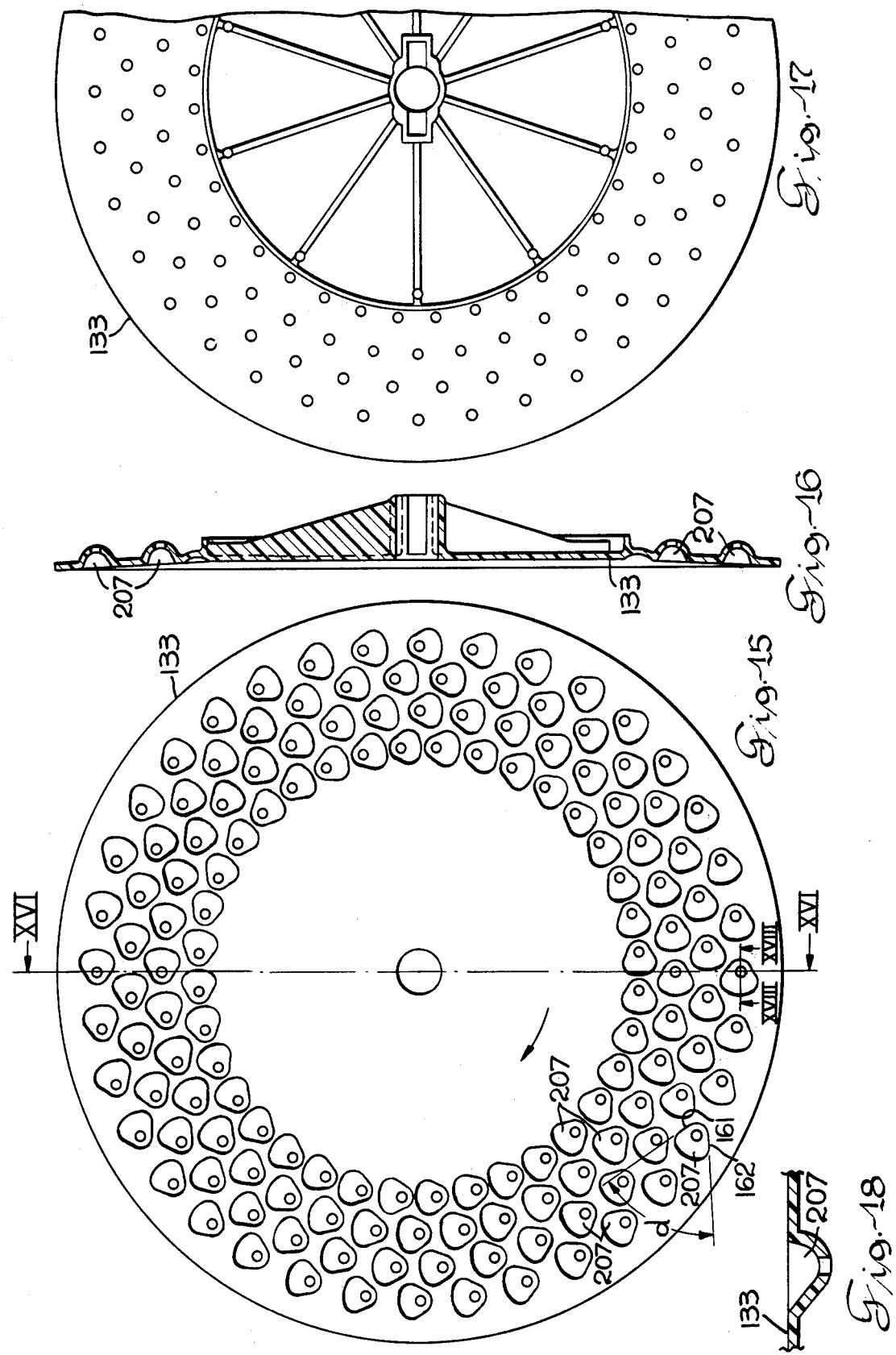

4,047,638

SEED DISC FOR AN AIR PLANTER

This is a continuation of application Ser. No. 511,385 filed Oct. 2, 1974, now abandoned.

RELATED APPLICATIONS

A copending U.S. Pat. application Ser. No. 508,672 of Charles E. Adams, Harold E. Quackenbush, Paul H. Harrer, LeRoy Langford and Alvin L. Cleek for Compressed Air Seed Planter shows the seed planting discs of this invention.

BACKGROUND OF THE INVENTION

The use of air pressure or vacuum to induce separation of kernels of grain from a bulk quantity is well known in the art. The use of a rotating drum with apertures is shown in U.S. Pat. Nos. 1,006,984; 3,156,201; 3,322,080; 3,542,242; 3,637,108; 3,731,842 and 3,762,603. The use of rotating discs in air or vacuum assist planters is shown in U.S. Pat. Nos. 1,046,199; 1,331,235; 2,991,909; 3,434,437 and 3,608,787.

BRIEF SUMMARY OF THE INVENTION

A seed disc of this invention is adapted for use in an air planter wherein flowing air is used to trap the seeds in perforated pockets in the vertically disposed disc as it rotates through or beside a pressurized housing cavity which contains seed. The perforated pockets are clam shell shaped with the gently sloping side being at the leading edge. The steeply sloping side at the trailing edge assists in mechanically lifting the seed, once it is in the pocket, as the pocket moves upwardly on a curved path towards its apex. When the seed carrying pockets pass to an open area at the bottom of the planter housing, they fall by gravity down the gentle slope of the pocket into the soil. The perforations in the pockets are smaller than the seed being planted and the air passing therethrough and differential pressure produced thereby induces the seeds to move into the pockets where they are maintained by the pressure differential between the cavity and the atmosphere. The seed disc rotates about an axis transverse to the direction of travel of the planter during planting and is so designed as to serve as a side cover for planter housing and for the seed cavity therein.

It is a general object of this invention to provide a seed planting disc which efficiently singulates kernels of seed from a bulk supply.

It is a further object of the present invention to provide a seed planting disc which is adapted to rotate about a transverse axis in sealing relation to one transverse side of a planter housing having a pressurized seed containing cavity.

It is a further object of this invention to provide a seed planting disc which has perforated clam shell shaped pockets spaced circumferentially about one axial side thereof.

It is a further object of this invention to provide a seed planting disc with perforated seed pockets shaped to afford a gentle slope at the leading edge side of the pocket and a steep seed retaining slope at the trailing edge side of the pocket.

It is a further object of this invention to provide a seed planting disc as hereinbefore described and additionally having a camming groove for each pocket extending circumferentially in the direction of rotation and radially inwardly so as to urge seed radially outwardly into the pocket as the latter passes by the seed containing cavity of the planter housing.

BRIEF DESCRIPTION OF THE DRAWINGS

The foregoing and other objects and advantages of this invention will be apparent on reference to the drawings in which:

FIG. 1 is a side view of a planter incorporating a seed disc of the present invention;

FIG. 2 is a top view of the planter shown in FIG. 1;

FIG. 3 is an enlarged side view of one planter unit of the planter shown in FIG. 1;

FIG. 4 is a section view taken along line IV—IV in FIG. 3;

FIG. 5 is a side view of the housing part of the planter unit of the present invention;

FIG. 6 is a front view of the housing shown in FIG. 5;

FIG. 7 is a rear view of the housing shown in FIG. 5;

FIG. 8 is a section view taken along the lines VIII—VIII in FIG. 5;

FIG. 9 is a section view taken along the lines IX—IX in FIG. 5;

FIG. 10 is a side view of a corn planting disc of the present invention;

FIG. 11 is a section view taken along the lines XI—XI in FIG. 10;

FIG. 12 is a side view of the corn planting disc as seen from the opposite side of FIG. 10;

FIG. 13 is a section view taken along the lines XIII—XIII in FIG. 10;

FIG. 14 is a section view taken along the lines XIV—XIV in FIG. 10;

FIG. 15 is a side view of a soybean planting disc of the present invention;

FIG. 16 is a section view taken along the lines XVI—XVI in FIG. 15;

FIG. 17 is a side view of the soybean planting disc shown as seen from the opposite side from FIG. 15; and FIG. 18 is a section view taken along the lines XVIII—XVIII in FIG. 15.

DETAILED DESCRIPTION OF THE DRAWINGS

Referring to FIGS. 1, 2 and 3, the planter includes a main frame 11 on which fertilizer hoppers 12 are disposed which deposit fertilizer behind the furrow openers 13 by way of tubes 14. The furrow openers 13 are not shown in FIG. 2 and form no part of the present invention. Wheels 16, 16' are rotatably mounted on ends of legs 17, 18 of a lift frame 19 which is pivotably positioned about an axis 20 by a hydraulic ram 21 interconnected between the frame 11 and an arm 22 of the lift frame 19. The wheels 16 not only support the planter, but also, on expansion of ram 21, raise planting units 23 out of their illustrated planting position. A planting unit subframe 24 is connected to main frame 11 by substantially parallel links 26, 27, 28, 29. A suitable disc-type furrow opener structure 30 is provided for the planting unit 23 and includes a pair of discs 31, 31' and a pair of transversely spaced runners or shoes 32, 32'. The shoes have their longitudinally central portions disposed on opposite sides of a seed planting disc 33 and converge at their front ends which carry scrapers for the inner, confronting sides of discs 31, 31'. The subframe 24 carries a housing 36 and a seed hopper 37. A press wheel 38 is mounted in trailing relation to the subframe 24 on a transverse axis 39 and serves to close the seed planting furrow to cover the seed. A pair of blowers 41, 42 mounted on frame 11 supply air to the housings 36 by way of suitable conduits 43, 44, 45, 46.

As shown in FIGS. 2 and 4, the seed planting discs 33 are ground driven by means of a power train which includes sprockets 51, 51' on wheels 16, 16' connected by endless drive chains 52, 52' to sprockets 53, 53' secured for rotation to a shaft 54. A sprocket 56 on the shaft 54 drives a parallel shaft 57 by means of an endless drive chain 58 in power transmitting relation to sprocket 56 and a sprocket 59 on the shaft 57. A third shaft 61 is parallel to shafts 54, 57 and is driven by shaft 57 by means of a sprocket 62 secured for rotation with shaft 57, a sprocket 64 connected for rotation with shaft 61 and a chain 63 operatively interconnecting the sprockets 62, 64. A sprocket 66 is provided on shaft 61 for each of the planter units 23 and each sprocket 66 is connected to a sprocket 68 on the associated planter unit 23 by a drive chain 69.

The sprocket 68 is nonrotatably connected to a shaft 71 to which a sprocket 72 is also nonrotatably connected. The sprocket 72 drives the disc 33 by means of a chain 73 and a sprocket 74, the latter being secured for rotation with a shaft 76 to which the disc 33 is secured by releaseable fastening means in the form of a nut 77. The shaft 76 is mounted in the housing 36 by a suitable bearing 78 and includes an enlarged radial flange 79 in axially abutting relation to the disc 33.

As shown in FIGS. 3, 4, 5, 7 and 8, the housing 36 includes a cavity 81 into which seeds from the bulk seed hopper 37 flow by gravity by way of a downwardly extending seed passage 82 which is formed by walls in the housing 36. The upper lip 84 of a bottom opening 83 in passage 82 tends to regulate the height to which the grain will flow into the cavity 81. Pressurized air is delivered by blower 41 by way of the conduit 43 to the upper end 92 of an air delivery passageway 91 of the housing 36. The upper end 92 of the passageway 91 has a tubular configuration suitable for fastening to the conduit 43 by a band-type fastening member 93. As shown in FIGS. 5, 6, 8 and 9, the air delivery passageway 91 extends downwardly terminating in an opening 96 at the forward side of the cavity in which seed is deposited through the passage 82 from the seed hopper 37.

Referring again to FIG. 3, the side land shoes 32, 32' are interconnected by a bridging brace 151 welded at its transversely opposite ends to the confronting sides of the plates 32, 32' and the assembly thus formed is held in place on the housing 36 by releaseable fastening means in the form of a bolt 152 extending through opening 153 in the housing 36 and a nut 154 disposed in a rectangular shaped window 156 in the housing 36 and in threaded engagement with the bolt 152.

Referring to FIGS. 10, 11, 12, 13 and 14, the construction of a corn planting disc 33 of the present invention is illustrated. The disc 33 is constructed of a relatively stiff flexible plastic material with radial ribs 101 to provide rigidity and strength for the central portion of the disc. The radially outer portion of the disc is somewhat more flexible to permit deflection of the disc from its slightly cupped shape as shown in FIG. 11 to a flattened installed condition as shown in FIG. 4 wherein the radially outer portion of the flat surface 102 confronting the housing 36 is in sealing engagement with a flat axially facing sealing surface 103. In other words, the axial surface 102 changes from a concave noninstalled condition to a substantially flat condition when installed in a planter. When installed, as shown in FIG. 4, the disc acts like a belleville washer to provide an axial force to insure sealing engagement between the axial facing radially outer portion of surface 102 (disposed radially outwardly of the pockets 107) and the complementary flat sealing surface 103 of the housing. The radially outer portion of the disc 33 includes walls defining a plurality of circumferentially spaced seed pockets 107 on the axial side of the disc which confronts the cavity 81. An annular sealing area 106 is provided by surface 102 radially inwardly from the seed pockets 107 which cooperates with a complementary sealing surface 108 formed on the housing in the area adjacent where the seed drops from the disc.

As shown in FIGS. 13 and 14, the seed pockets 107 each include a steep side surface 115 at its trailing edge which is nearly perpendicular to the disc 33 and a gradually sloping surface 109 at its leading edge. Each of the pockets is perforated through provision of an axial opening 110 which is smaller than the corn seed to be planted. The radially opposite sides 151, 152 of each pocket are disposed at acute angles $b$ and $c$ to the direction of rotation whereby the sides serve to cam seed in the pocket toward the opening 110 as the pocket moves through the seed in cavity 81. In other words, the sides 151, 152 of the pocket 107 diverge in the direction of rotation of the disc. For corn seed, it has been found desirable to provide seed loading assistance ramps or camming grooves 111 which extend circumferentially in the direction of rotation and radially inwardly from the pockets 107. As shown in FIG. 14, the seed camming grooves 111 are tapered to increasing depth when moving from leading to trailing sides thereof. Stated differently, the grooves 111 taper to decreasing depth in the direction of rotation of the disc. As shown in FIG. 10, the disc rotates in a clockwise direction and the camming grooves 111 are in leading relation to the pockets 107 thereby tending to cam the kernels of corn radially outwardly into the pockets 107 as the disc rotates the pockets and ramps upwardly through the seed corn deposited in the cavity 81.

FIGS. 15, 16, 17 and 18 illustrate a second embodiment of the present invention in the form of a seed planting disc 133 for soybeans. It will be noted that four concentric circular rows of circumferentially spaced pockets 207 are provided. These pockets 207 are similar in shape to those for the corn planting plates illustrated in FIGS. 10 through 13; however, they do not have the camming grooves 111 and their shape is slightly different. Specifically it will be noted that the radially opposite sides 161, 162 of pocket 207 define an acute angle $d$ whereas the sides 151, 152 of pocket 107 defines an obtuse angle $e$ between 90 and 120 degrees. The alignment and spacing of the pockets 207 in soybean disc 133 is such that the seeds drop into the soil in spaced relation to one another in the direction of travel.

OPERATION

Referring to FIGS. 3 and 4, as the corn seed planting disc 33 rotates, the pockets pass upwardly by the seed cavity 81 which is disposed at about the 4 o'clock position as viewed in FIG. 3. As each pocket moves by the edge of the bulk seed in the cavity, a kernel of corn is induced to move into the pocket by air flowing from the pressurized cavity 81 to atmosphere by way of the opening 110 in each pocket 107. The trailing surface 115 of the pocket 107 being nearly horizontal, at this point of rotation of the disc, provides a shelf to support the seed kernel as the pocket moves upwardly.

As the disc continues its counterclockwise rotation, as viewed in FIG. 3, each pocket will move adjacent a flexible pad 121, at about the 1 o'clock position, which serves to retain the single kernel of seed in the pocket until the trailing edge 122 of the pad 121 is passed, at about the 8 o'clock position, at which point the seed drops into the furrow opened by discs 31, 31' and held open by vertically disposed shoes 32, 32' of furrow opener structure 30. The arcuate resilient pad 121 is made of suitable flexible plastic material of uniform thickness with an outer layer of tough plastic presenting a flat surface 123 confronting the pockets 197. As shown in FIG. 3, the pad 121 is fastened to the housing by a pair of screws 126 threadedly engaging drilled and tapped openings 127 (shown in FIG. 5). As shown in FIG. 4 the resilient pad 121 has been compressed to a reduced thickness. The pad serves to seal the cavity 81 by its engagement with the disc 33 between the housing sealing surfaces 103 and 108. The bottom of the cavity 81 is closed by sealing engagement between the disc 33 and an axially facing sealing surface 137 on flange 136 extending radially inward from sealing surface 103 to sealing surface 108. Actually the sealing surfaces 103, 137 and 108 are continuous and lie in the same vertical plane.

In the event a kernel of seed is lodged or stuck in the pocket 107, a slanting seed dislodging edge 131 on spur flange 132 will serve to cam the seed loose if a portion thereof extends from the pocket 107. The loosened seed will have time to drop as the pocket 107 moves from the spur flange 132 to the sealing flange 136. The seed dislodging edge intersects the circle 138 in which the pockets rotate about the axis 176 of shaft 76 at an acute angle "a". FIG. 4 shows the stuck seed moving into engagement with the seed dislodging edge 131.

During operation, the disc 33 serves as a side wall closure for the cavity 81 on one axial side thereof through its sealing contact with the surface 123 of the pad 121 and the sealing surfaces 103, 137 and 108 on the housing 36. It will be noted on reference to FIGS. 5 and 8, that walls 141, 142 and flange 132 form an open seed drop portion at the bottom of the housing 36 which is not pressurized and through which the seeds drop into the furrow.

During planting operation each pocket 107 moves in a circular path upwardly alongside the seed containing cavity 81 disposed in the lower rear of the housing. The pocket 107 thence moves upwardly past the seed containing part of pressurized cavity 81 into an upper chamber 181 of the cavity where any kernels of seed in excess of one have an opportunity to drop out of the pocket before the pocket moves into confronting relation with the sealing surface 123 of pad 121.

It is relatively easy to change from a corn planting disc 33 to a soybean planting disc 133, because the disc can be removed axially from the housing and shaft 76 upon removal of the releaseable fastening member in the form of nut 77. The vertically disposed shoes 32, 32' need not be removed. After the disc 33 is shifted axially to the left, as viewed in FIG. 4, sufficiently to move it off the pilot portion 143 of the shaft 76, it may be tilted axially outward at its top and lifted upwardly and outwardly.

The embodiments of the invention in which an exclusive property or privilege is claimed are defined as follows:

1. A seed disc for an air planter having means to rotatably drive said disc, a seed cavity and a seed drop portion, said seed disc comprising:
   a relatively rigid central portion adapted for connection to said drive means whereby said disc is rotated about its axis in one direction of rotation when said planter is engaged in a planting operation, said axis being substantially horizontal and transverse to the direction of travel of said planter during the planting operation, and
   a radially outer portion having
      walls defining a plurality of circumferentially spaced pockets in one axial side of said disc, each of said pockets having
         an axially extending surface defining a shelf at the trailing edge of said pocket operable to assist in supporting a kernel of seed in said pocket as said disc is rotated in said one direction to move said pocket in an upward arc,
         a gently sloping surface from the bottom to the leading edge of said pocket facilitating movement of a kernel of seed into said pocket as said pocket communicates with said seed cavity during rotation of said disc in said one direction and facilitating dropping of said kernel of seed from said pocket when said pocket moves in a downward arc through said seed drop portion, and
         a small opening between the bottom of said pocket and the other axial side of said disc, said opening being sufficiently small to prevent passage therethrough of kernels being planted and
      walls defining a camming groove extending circumferentially in said one direction of rotation of said disc and radially inwardly from each pocket whereby said camming groove urges seed radially outwardly toward its associated pocket as said disc is rotated through a quantity of bulk seed.

2. The seed disc of claim 1 wherein said camming grooves taper to decreasing depth in said one direction of rotation of said disc.

3. The seed disc of claim 1 wherein said pockets are circumferentially spaced from one another in a plurality of concentric circular rows of different radii.

4. The seed disc of claim 1 and further comprising axially facing annular sealing surface areas on said one side of said disc on radially opposite sides of said pockets.

5. The seed disc of claim 1 wherein said outer portion is resiliently flexible in an axial direction.

6. The seed disc of claim 5 wherein said seed disc is slightly cupped in its noninstalled condition whereby said one side is concave.

* * * * *